United States Patent
Bono et al.

(10) Patent No.: US 9,485,310 B1
(45) Date of Patent: Nov. 1, 2016

(54) MULTI-CORE STORAGE PROCESSOR ASSIGNING OTHER CORES TO PROCESS REQUESTS OF CORE-AFFINED STREAMS

(71) Applicant: EMC Corporation, Hopkinton, MA (US)

(72) Inventors: Jean-Pierre Bono, Westborough, MA (US); John Forecast, Newton, MA (US); Mukesh Gupta, Shrewsbury, MA (US); Frederic Corniquet, Le Pecq (FR); Philippe Armangau, Acton, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 114 days.

(21) Appl. No.: 14/580,865

(22) Filed: Dec. 23, 2014

(51) Int. Cl.
G06F 15/16 (2006.01)
H04L 29/08 (2006.01)
G06F 17/30 (2006.01)

(52) U.S. Cl.
CPC ..... H04L 67/1097 (2013.01); G06F 17/30197 (2013.01)

(58) Field of Classification Search
CPC .............. H04L 67/1097; H04L 17/30197
See application file for complete search history.

(56) References Cited

U.S. PATENT DOCUMENTS

| | | | |
|---|---|---|---|
| 5,872,972 A | 2/1999 | Boland et al. | |
| 2008/0084865 A1* | 4/2008 | Archer | H04L 45/42 370/351 |
| 2008/0084889 A1* | 4/2008 | Archer | H04L 45/00 370/400 |
| 2014/0310418 A1* | 10/2014 | Sorenson, III | H04L 67/1002 709/226 |
| 2015/0134797 A1* | 5/2015 | Theimer | H04L 41/24 709/223 |
| 2015/0186180 A1 | 7/2015 | Schroth et al. | |
| 2015/0280959 A1* | 10/2015 | Vincent | H04L 67/1097 709/203 |

* cited by examiner

*Primary Examiner* — Krisna Lim
(74) *Attorney, Agent, or Firm* — BainwoodHuang

(57) ABSTRACT

A multi-core processor of a network attached storage system processes requests from host computers for services of a file system service. Each core maintains endpoints of respective connection-layer connections to the hosts to affine respective streams of network traffic with the core, and dynamically and preferentially assigns execution threads of the core to process file system service requests of the streams affined with the core. Each core also co-operates with the other cores to dynamically and non-preferentially (a) assign execution threads of the core to process file system service requests of the streams affined with the other cores, and (b) assign execution threads of the other cores to process file system service requests of the streams affined with the core, promoting efficient use of the cores for the processing workload of the file system service.

14 Claims, 6 Drawing Sheets

MULTI-CORE STORAGE PROCESSOR ASSIGNING OTHER CORES TO PROCESS REQUESTS OF CORE-AFFINED STREAMS

BACKGROUND

The present invention is related to the field of data storage systems providing file system services to host computers via a network, referred to herein as "network attached storage" systems.

A network attached storage (NAS) system may employ one or more storage processors that execute a file system service application and other programs to form functional modules that collectively provide a file system service to host computers via a network. Examples of network-provided file system services include Network File System (NFS) and Common Internet File System (CIFS). In operation, the NAS system forms persistent network connections with the hosts over which the hosts request file system operations and the NAS system returns corresponding responses. Typical file system operations include opening, closing, reading from and writing to a file contained in a file system on the NAS, which is treated by the host as an extension of its file system.

SUMMARY

Like other processor-based systems, NAS systems may employ so-called "multi-core" processors that include multiple independent instruction execution units sharing the processing load for a single instance of an application program that is executed to provide file system services. Typically, the cores are realized as separate sections of a single monolithic integrated circuit serving as a processing unit having connections to a memory, I/O circuitry, etc. In such systems, it is necessary to divide the processing load intelligently among the cores to obtain efficient use of hardware resources and desirably high performance.

In a NAS system specifically, it can be desirable to persistently associate, or affine, the network traffic of different hosts with respective different cores, and as a general matter to process the file system service requests of the hosts within the respective affined cores. Employing such core affinity can promote high performance and efficiency by minimizing the need for host-specific data to be transferred among the cores, a situation that can lead to cache thrashing and reduce performance. However, there can be situations during operation in which the network traffic directed to a given core exceeds the processing capability of that core, while at the same time there may be other cores experiencing relatively lighter loading. This represents inefficiency by failure to fully use all available hardware resources, and can also adversely affect performance. Maintaining strict affinity between the hosts and cores can reinforce this inefficiency. If at a given time certain hosts are generating significant file system demand while other hosts are not, the cores handling the connections to those other hosts may be relatively idle, and the strict affinity would prevent any redistributing of the workload for better overall utilization of the cores.

Methods and apparatus are disclosed that can improve the efficiency and performance of multi-core processors in the context of a NAS system, in particular efficiency and performance based on the utilization of the cores. A NAS system can use the disclosed techniques to realize a desired balance between the benefits of host-core affinity and the benefits of fuller utilization of the cores.

A method is disclosed of operating a multi-core processor of a network attached storage system to process requests from host computers for services of a file system service. The method includes, at each core of a set of cores of the multi-core processor, (1) maintaining endpoints of respective connection-layer connections to the hosts to affine respective streams of network traffic with the core, and (2) dynamically and preferentially assigning execution threads of the core to process file system service requests of the streams affined with the core. This much of the method promotes the efficiency and performance benefits from host-core affinity.

The method further includes (3) co-operating with the other cores to dynamically and non-preferentially (a) assign execution threads of the core to process file system service requests of the streams affined with the other cores, and (b) assign execution threads of the other cores to process file system service requests of the streams affined with the core. This operation is performed only under appropriate conditions, such as when all local threads are busy and another core has at least one idle thread and no overriding local requests, so that the idle thread of the other core can be used to process the request. While this operation effectively reduces affinity and the benefits thereof, it enables overall better utilization of processing resources and can provide offsetting efficiency and performance benefits.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
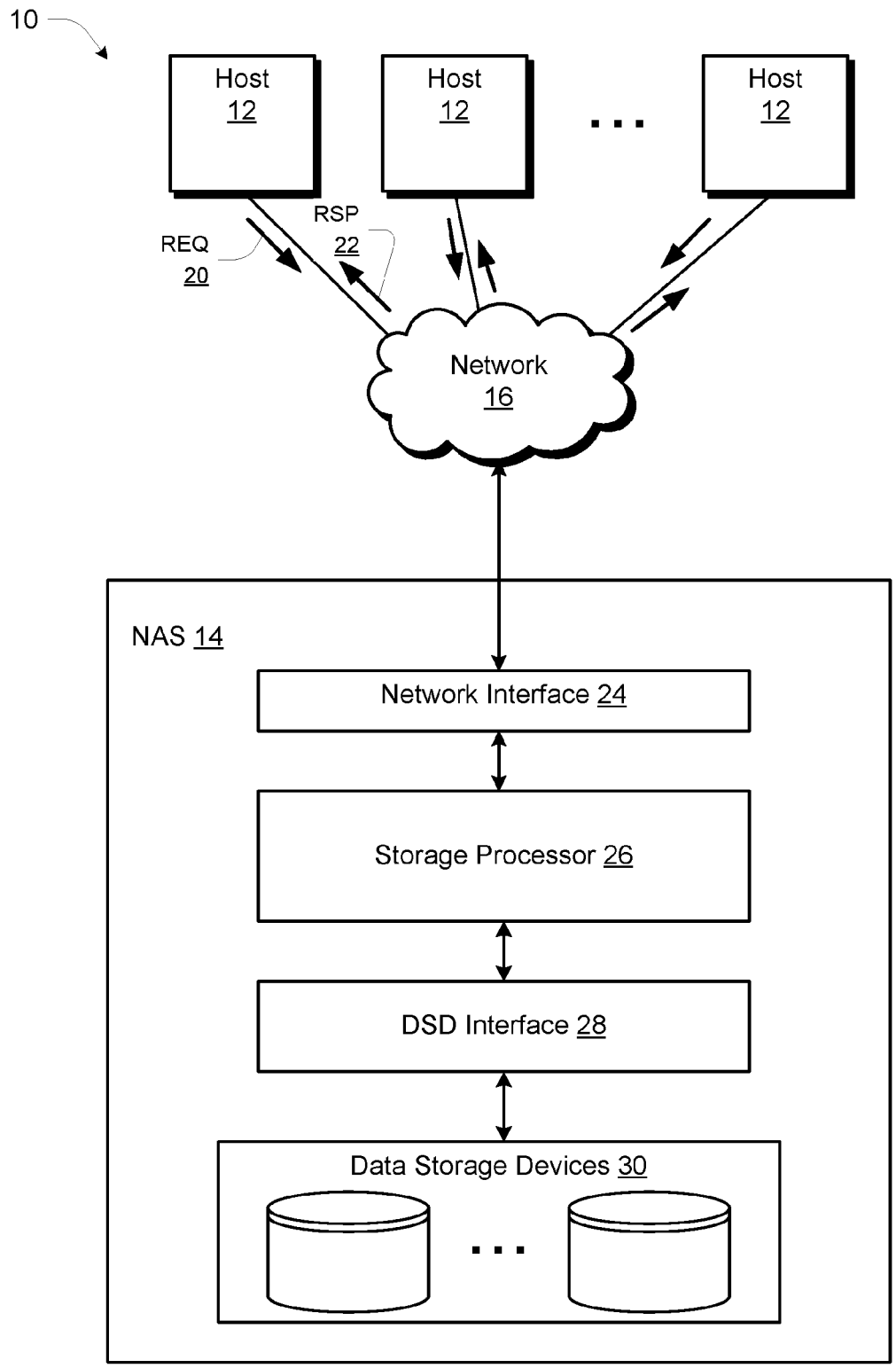
FIG. 1 is a block diagram of a distributed computer system.

FIG. 1 shows a distributed computer system 10 including host computers (HOSTs) 12 and a network attached storage system (NAS) 14 coupled to a network 16. The NAS 14 provides data storage services to the hosts 12, specifically a file system service making storage visible to the hosts 12 as extensions of their respective host file systems. Communications between the hosts 12 and NAS 14 employs a distributed file system (FS) protocol over the network 16 as generally known in the art. Known examples include the Network File System (NFS) and Common Internet File System (CIFS) protocols. For the present description the FS protocol employs requests (REQ) 20 sent by the hosts 12 to the NAS 14, and corresponding responses (RSP 22) returned to the hosts 12 by the NAS 14. Common file system operations and corresponding request/response pairs include file OPEN, file CLOSE, file READ, and file WRITE. The network 16 is typically a general-purpose network such as an Internet Protocol (IP) network, in contrast to a more storage-oriented network such as a FibreChannel storage area network (SAN).

The NAS 14 includes a network interface 24, storage processor 26, data storage device (DSD) interface 28, and data storage devices 30. The data storage devices 30 provide nonvolatile read/write data storage, and may be realized as magnetic disks, Flash memory, etc. The network interface 24 provides the physical-layer connection to the network 16, e.g., Ethernet connectivity. The DSD interface 28 provides connection to the data storage devices 30 via a storage-oriented interface such as Small Computer System Interface (SCSI) and FibreChannel. The storage processor 26 is a high-performance processing complex that provides extensive functionality in software-implemented form, including a high-level protocol endpoint (e.g., NFS, CIFS) for the FS protocol, functionality of the file system service, and use of the data storage devices 30 to provide the underlying data storage for the file system service.

Figure 2:
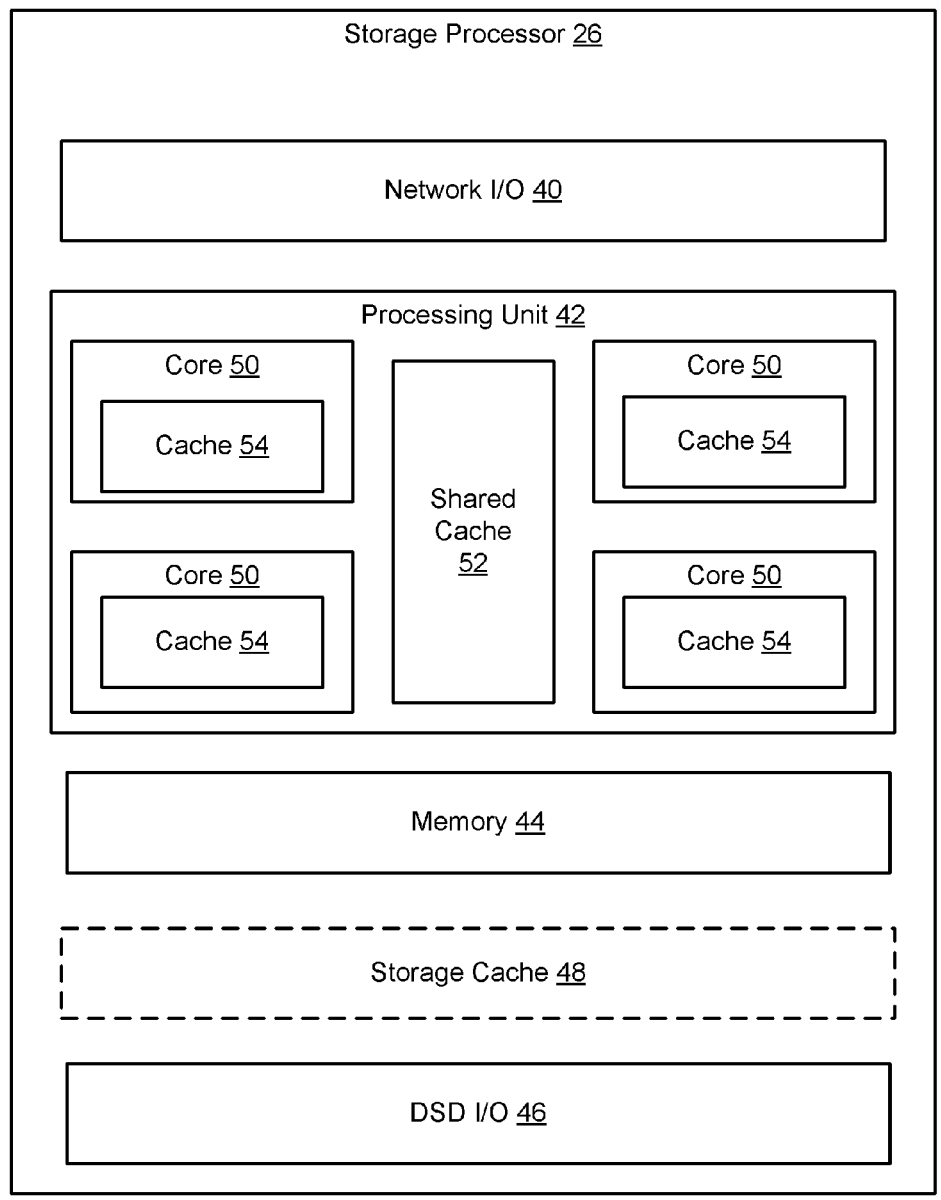
FIG. 2 is a block diagram of a storage processor from a hardware perspective.

FIG. 2 shows the storage processor 26 from a hardware perspective. It includes network input/output (I/O) circuitry 40, a processing unit 42, memory 44, and DSD I/O circuitry 46. It may also include additional memory used as a storage cache 48.

The memory 44 is the directly addressable system memory of the processing unit 42. It is commonly realized using high speed dynamic random access memory (DRAM) connected to the processing unit 42 by a high speed data bus (not shown). The network I/O circuitry 40 connects the physical-layer network interface 24 (FIG. 1) to the memory 44 for data transfer therebetween, and similarly the DSD I/O 44 connects the DSD interface 28 to the memory 44 and/or storage cache 48.

The processing unit 42 is of a type known as "multi-core", having multiple independent execution units called "cores" 50. The cores 50 have shared access to the memory 44, typically via a large shared cache 52 and smaller respective per-core caches 54. In operation, the cores 50 can simultaneously execute respective streams of instructions and access respective data from the memory 44, under the control of hardware and software mechanisms that manage the use of the cores 50 for a processing workload, such as that of the file system service as mentioned above and described more below.

Figure 3:
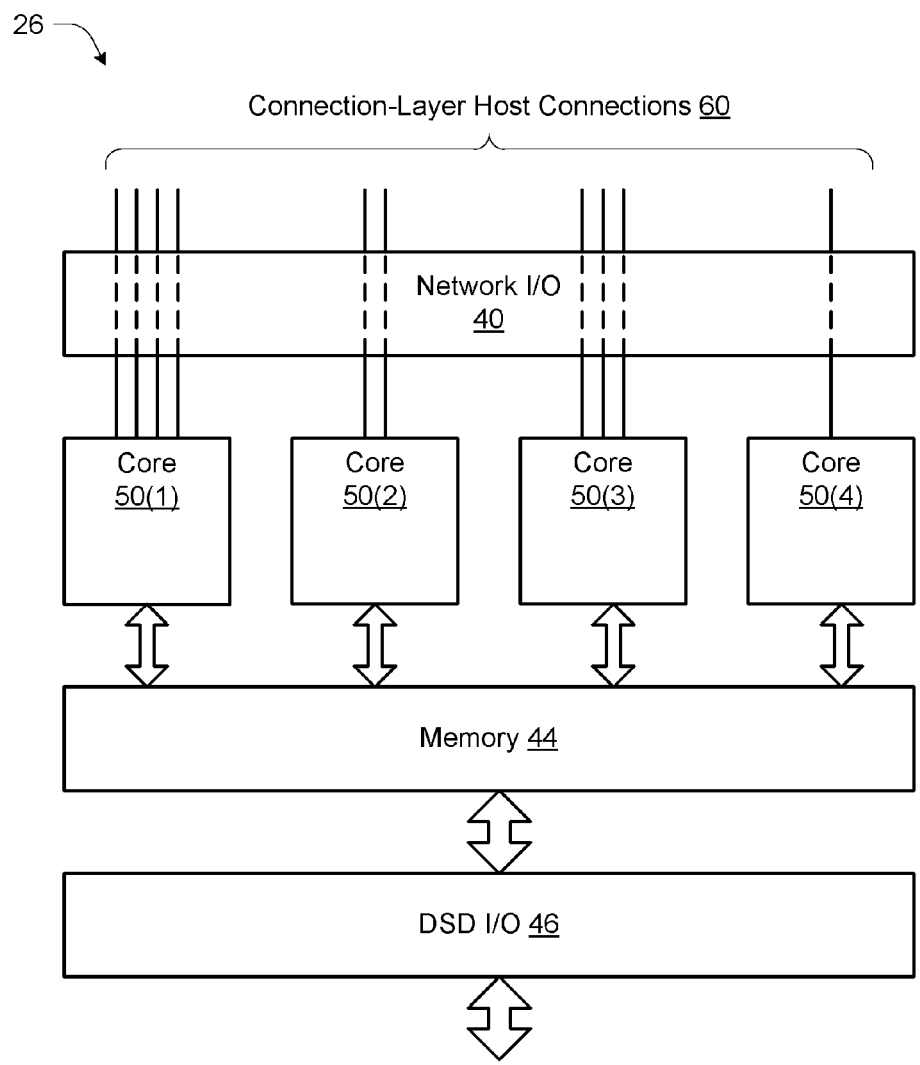
FIG. 3 is a functional block diagram of a multi-core storage processor.

FIG. 3 shows a functional view of the storage processor 26 as it relates to use of the cores 50. In operation, communications with the hosts 12 (FIG. 1) are via respective connection-layer connections 60 carried by the network 16 and the network I/O circuitry 40. The term "connection-layer" refers to the known multi-layer representation of network operation, and the connections 60 are logical connections defined at the connection layer. In one example, these are Transmission Control Protocol (TCP) connections. As generally known in the art, a TCP connection is partly defined by a pair of tuplets for respective ends of the connection, each tuplet including an IP address, TCP protocol identifier, and TCP port number. In the storage processor 26, the connections 60 are persistently assigned to, or "affined" with, respective cores 50. Thus in the illustrated example, core 50(1) has four distinct connections 60 to respective hosts 12, core 50(2) has two such distinct connections 60, etc. It will be appreciated that the connections 60 are depicted logically for ease of description, and that at a hardware level the network traffic of the connections 60 travels through the memory 44 for processing by the respective core 50.

Figure 4:
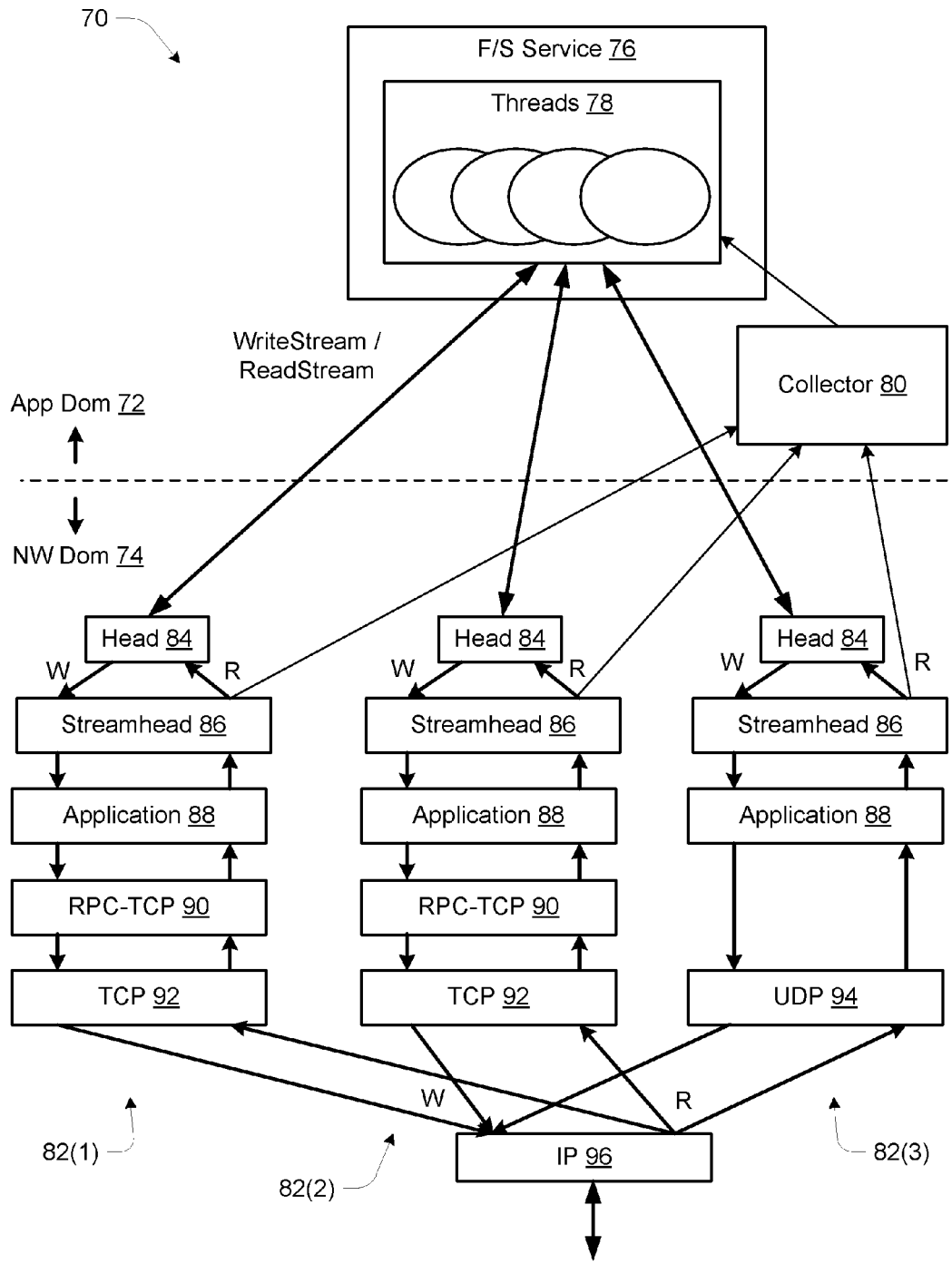
FIG. 4 is a schematic depiction of processing modules and data paths in a core of a multi-core storage processor.

FIG. 4 depicts pertinent functional organization 70 of a core 50, where the functions are software-implemented in the form of modules or other functional components as generally known in the art. The organization is divided into two separate domains, an application domain (App Dom) 72 and a real-time or "network" domain (NW Dom) 74. In the application domain 72 is the file system service 76 shown as including a set of execution threads or "threads" 78, as well as a collector module or "collector" 80. The network domain 74 includes a set of stream network stacks 82, which in the illustrated example include two TCP-oriented stacks 82(1), 82(2) and a UDP-oriented stack 82(3), where UDP refers to User Datagram Protocol (UDP). UDP is a connectionless protocol and is used for control and other communications that are outside of a specific file system service session of a host 12 that is carried on a respective connection 60 (FIG. 3).

The stream network stacks 82 provide paths for the file system service 76 to communicate with the hosts 12 via network 16 using a "stream" paradigm that is distinct from other types of network connections, notably from so-called "socket" connections. From the perspective of the file system service 76 including the threads 78, each stream network stack 82 is a "stream" object that can be written to and read from by the threads 78 using a stream application programming interface (API). The stream API includes routines such as Open_Stream, Close_Stream, Read_Stream, and Write_Stream that operate upon a head object or "head" 84 serving as the point of communication between the respective stream network stack 82 and the threads 78. In the description below, the term "stream" refers to a flow of data items through a stream network stack 82, which corresponds to a flow of file system requests 20 and responses 22. Thus successive requests 20 are received from the network 16 and processed upward in a stream network stack 82, resulting in the information content of the requests 20 being conveyed to threads 78 in a series of Read_Stream calls. Similarly, the threads 78 provide response information to a stream network stack 82 using a series of Write_Stream calls, and the response information is processed downward in the stream network stack 82 to result in a series of responses 22 sent across network 16 to requesting hosts 12, i.e., each response 22 is sent to the host 12 from which the corresponding request 20 was received.

Additional layers of a stream network stack 82 include a streamhead module 86 and an application module 88. Service functions may be defined if a module deals with flow control. The TCP-oriented stream network stacks 82(1), 82(2) include a remote procedure call—TCP (RPC-TCP) module 90 and a TCP module 92, while the UDP-oriented stream network stack 82(3) includes a UDP module 94. In each of the modules 86-92, stream traffic is divided into separate read and write portions, processed separately and independently at each layer. In the illustrated arrangement, all three stream network stacks 82 interface to a single IP module 96 that interfaces to the network 16 and to which the read/write separation of stream processing also extends as shown.

For ease of description, the data read from a head 84 that conveys the contents of a request 20 to a thread 78 is referred to as a "request" or a "file system service request", and the data written to a head 84 that conveys the contents of a response 22 from a thread 78 is referred to as a "response" or "file system service response". The application module 88 and RPC-TCP module 90 translate between these internal representations of requests and responses and the corresponding protocol-compliant, or "well formed" requests 20 and responses 22 carried by network 16. In particular, the application module 88 is responsible for parsing the contents of remote procedure calls in received network traffic to identify well-formed requests 20 (e.g., NFS or CIFS requests), and for providing these well-formed requests to the streamhead module 86 where they are provided to threads 78 in response to Read_Stream calls. The application module 88 is also responsible for generating RPC callbacks from responses written into the stream by Write_Stream calls, and providing the callbacks to the RPC-TCP module 90 for forwarding to a host 12 across the network 16.

At a high level, the organization of FIG. 4 effects multithreading as well as core-affined stream processing that promote computing efficiency. Each core 50 includes a number of threads 78 that can process file system service requests 20 as received from the stream network stacks 82. In practice the number of threads 78 is fixed over at least short periods of operation, e.g., days to months, although the number might be adjustable in some embodiments to enable a system administrator to tune performance. Each core 50 also has a respective set of stream network stacks 82 as described above, and a respective collector 80 that manages the connections of the threads 78 to the streams of the stream network stacks 82 as described more below. Maintaining stream affinity helps maintain stream-specific execution context within a given core 50. Over time as the file system operations of a given stream are performed, respective file system metadata migrates to the cores 50 with which the respective streams are affined, specifically to the respective per-core caches 54 of the cores 50. Processing efficiency is obtained by reducing average memory latency due to increased cache hit ratios.

There can be situations during operation in which the network traffic directed to a given core 50 exceeds the processing capability of that core 50, while at the same time there may be other cores 50 experiencing relatively lighter loading. This represents a certain inefficiency, namely failure to fully use all available hardware resources (i.e., cores 50). It will be appreciated that maintaining strict stream affinity could reinforce this inefficiency. If at a given time certain hosts 12 are generating significant file system demand while other hosts 12 are not, the cores 50 handling the connections 60 to those other hosts 12 may be relatively idle, and strict affinity of the streams would prevent any redistributing of the workload for better overall utilization of the cores 50.

Thus as described more below, another function of the collector 80 is to monitor both the availability of local threads 78 (i.e., of the same core 50) for processing requests 20, as well as the level of demand for processing from the local stream network stacks 82 (i.e., of the same core 50), and provide for selectively routing file system requests and responses among the cores 50 to make better overall utilization of them. Specifically, the collector 80 of each core 50 provides for a local thread 78 to be used to process a request from a stream network stack 82 of another core 50, and vice-versa—for a thread 78 of another core 50 to be used to process a request from a local stream network stack 82 of this core 50. For this functionality the other core 50 may be referred to as a "remote" core 50 and its requests and threads 78 as "remote" requests and threads respectively. While this cross-core activity effectively reduces stream affinity and the context-related efficiency that comes with it, it does so in furtherance of another efficiency in the form of full use of hardware resources. Those skilled in the art will appreciate based on the present description that the disclosed techniques can be implemented to achieve a desired balance between these two forms of efficiency to best achieve overall system goals.

Figure 5:
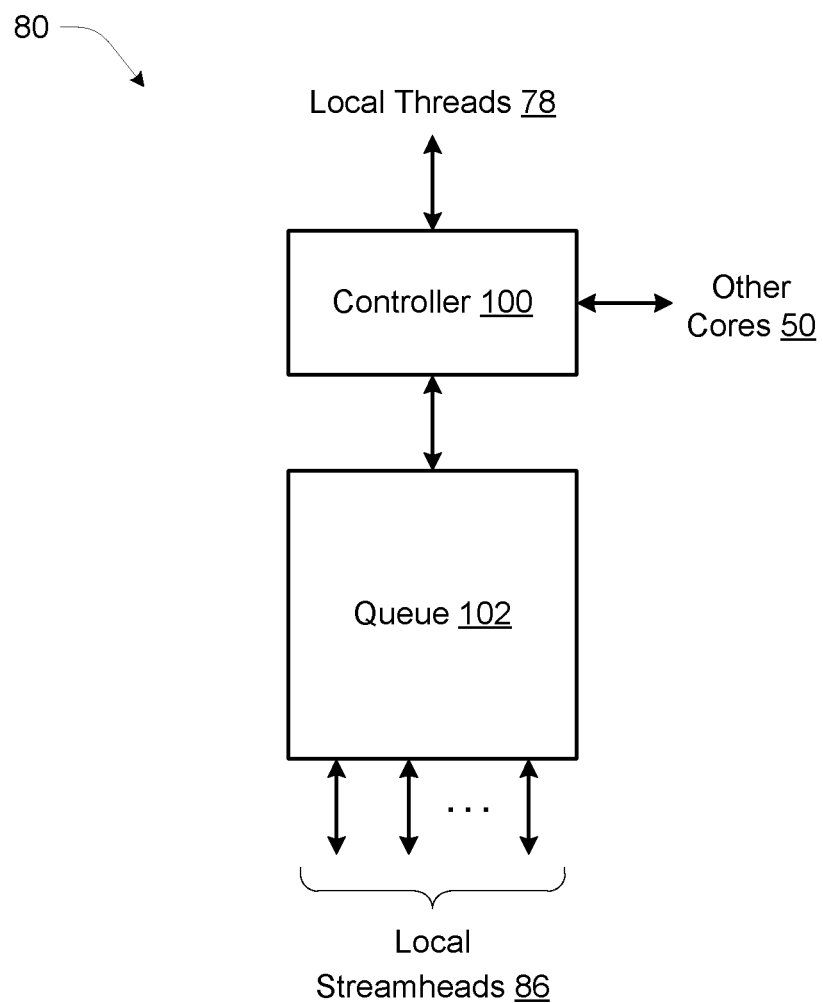
FIG. 5 is a block diagram of a collector module.

FIG. 5 shows the structure of a collector 80. It includes a control component or controller 100 and a queue 102. The controller 100 communicates with the local threads 78 and the queue 102, as well as with corresponding controllers 100 of respective collectors 80 of other cores 50. The queue 102 is in communication with the local streamhead modules 86 (FIG. 4). The queue 102 holds file system service requests that have been received via a stream network stack 82 and are either being processed by a respective thread 78 or awaiting such processing.

Referring to both FIG. 4 and FIG. 5, once a well-formed file system service request reaches the stream head 86 of a respective stream network stack 82, the streamhead module 86 calls a function of the collector 80. Assuming there is at least one thread 78 available to process the request, an entry is added to the queue 102, and the collector 80 selects a thread 78 for handling the request and activates or "awakens" the selected thread. The selected thread 78 obtains the next entry from the queue 102, which identifies the head 84 that the thread 78 is to read from to obtain a file system request for processing. The thread 78 issues a Read_Stream to the identified head 84 to obtain the file system service request, then performs the file system processing for the request and returns a corresponding response by issuing a Write_Stream to the same head 84. The response travels down the stream network stack 82 and becomes a protocol-level response 22 to the requesting host 12. After issuing the Write_Stream, the thread 78 becomes available to the collector 80 to process another file system service request from the queue 102.

Thus the collector 80 manages the signaling of new requests to the file system service 76 on behalf of all the stream network stacks 82, making the signaling simpler over alternatives in which the threads 78 poll or otherwise engage in signaling with the several local stream network stacks 82.

The above assumes immediate availability of a thread 78 to process a new file system request in the stream from a given stream network stack 82. In the event that all threads 78 of the core 50 are already busy, then under some circumstances (described more below) an entry for the new file system service request is placed on the queue 102 to await availability of a thread 78. Additional entries for subsequent file system service requests might also be placed on the queue 102. Once a thread 78 becomes available, the collector 80 assigns the thread 78 to process a next request as identified by the next entry on the queue 102, i.e., the top or head of the queue. Processing then proceeds as described above for the immediate availability situation.

Regarding the above-described local processing (in a core 50) of streams affined to that core 50, i.e., streams of the stream network stacks 82 of the core 50, the following will be appreciated:
1. Any idling of one or more local threads 78 reflects a potential inefficiency in terms of underutilized resources.
2. Any use of the queue 102 to hold requests that are awaiting assignment of a thread 78 reflects potentially sub-optimal performance in terms of additional request delay and limitation of request processing throughput of the file system service 76.

Thus the collectors 80 of the respective cores 50 have additional functionality enabling a thread 78 of one core 50 to process requests of streams affined to another core 50. This operation can help address both issues 1 and 2 above, i.e., it can improve efficiency and performance over an alternative in which streams can be processed only locally. This additional functionality of each collector 80 includes both the following:

1. Monitoring the usage of the local threads 78 and signals received from the collectors 80 of the other cores 50 regarding their availability to process requests from other cores 50. Under appropriate conditions, e.g., when all local threads 78 are busy, then selectively directing a new request from a local stream network stack 82 to another core 50 via the respective collector 80, based on that collector 80 indicating that it can accept a new request from another core 50. Also, accepting a corresponding response from the other collector 80, and directing the response to the appropriate local stream network stack 82.

2. Monitoring the usage of the local threads 78 as well as the local queue 102 to identify the ability to process requests from another core 50, and signaling the other cores 50 regarding this ability. Under appropriate conditions, i.e., when one or more local threads 78 are idle and the queue 102 holds no requests from local stream network stacks 82, then receiving a new request from another core 50 via the respective collector 80 and assigning an available local thread 78 to process the request. When the processing is complete, routing the response back to the requesting collector 80 for return to the corresponding host 12 via the respective stream network stack 82 of the other core 50.

A collector 80 monitors for availability of the local threads 78 in the course of assigning these threads 78 for processing requests and then being informed when the processing is completed and a response has been returned to the head 84 from which the request was obtained. When at least one local thread 78 is idle, it can be assigned. The collector 80 preferentially assigns the thread 78 to process requests from a local stream network stack 82, if there are any. If no local requests are waiting, the collector 80 signals to the other collectors 80 its ability to receive a request from one of them for processing by a local thread 78. Another collector 80 can use this indication to direct a request to this collector 80 if necessary, i.e., if that other collector 80 has no local threads 78 available. This operation of directing a request to another core is non-preferential, i.e., it is done only if a request cannot be processed locally. Local processing is preferred for the reasons discussed above, i.e., to maintain context and relatively high hit ratio of the local cache 54 rather than causing data to migrate to the cache 54 of another core 50 along with the request processing.

In one embodiment, a collector 80 signals its ability to accept a request from another core 50 when there are no new local requests in the local queue 102 and there is at least one local thread 78 that is idle. In this case the signal might have a binary nature, i.e., the signal has two distinct states, one of which indicates ability to accept a request and the other indicating inability to accept a request. In alternative embodiments, both the conditions and the signaling may be different, and in particular may be non-binary. While this may be somewhat more complicated to implement, it may provide greater efficiency and/or performance. As an example, a collector 80 might signal the number of idle threads 78 it currently has, and another collector 80 can implement a selection from among multiple candidate destinations for a request based on the respective numbers. Thus a collector 80 having multiple idle threads 78 may be preferred over a collector 80 having only one idle thread 78. Similarly, a collector 80 might have a non-binary condition for routing a request to another core. There could be levels of urgency for such routing, based for example on the number of entries in the local queue 102 (more entries implies greater urgency), and a collector 80 could employ a threshold, which could be dynamically adjustable, to trigger the routing of requests to another core 50.

Figure 6:
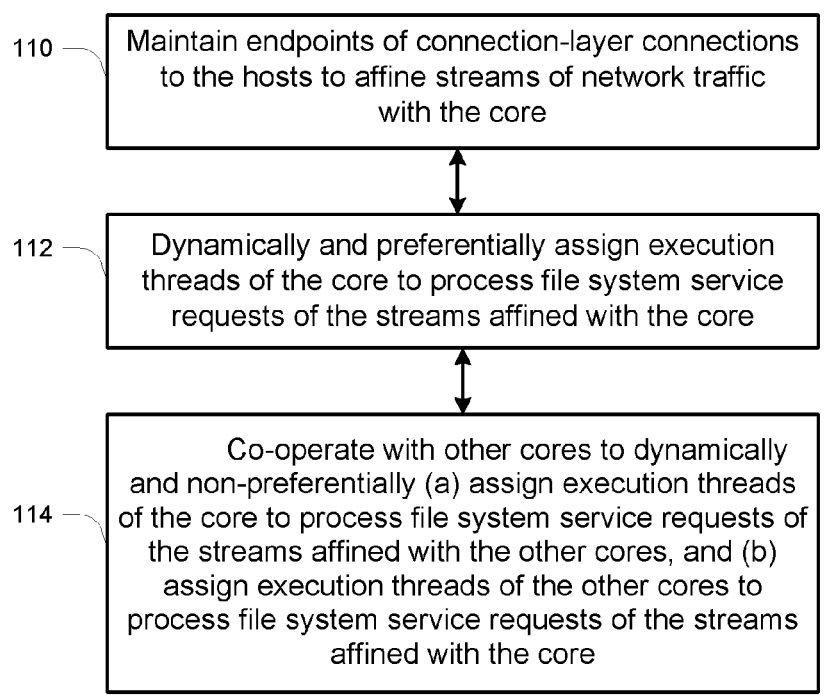
FIG. 6 is a flow diagram of operation of modules of a core of a storage processor.

FIG. 6 is a high-level flow diagram of operation of an individual core 50 in the context of the inter-core routing of requests as described herein. At 110, the core 50 maintains endpoints of respective connection-layer connections 60 to the hosts 12 to affine respective streams of network traffic with the core 50. This function is performed in the stream network stack 82, specifically by the collection of modules 88, 90 and 92. At 112, the core 50 dynamically and preferentially assigns execution threads 78 of the core 50 to process file system service requests of the streams affined with the core 50, i.e., the streams of the local stream network stacks 82. At 114, the core 50 co-operates with other cores 50 to dynamically and non-preferentially (a) assign execution threads 78 of the core to process file system service requests of the streams affined with the other cores 50, and (b) assign execution threads 78 of the other cores 50 to process file system service requests of the streams affined with the core. Steps 112 and 114 are performed primarily by the collectors 80.

While various embodiments of the invention have been particularly shown and described, it will be understood by those skilled in the art that various changes in form and details may be made therein without departing from the spirit and scope of the invention as defined by the appended claims.

What is claimed is:

1. A network attached storage system for providing a distributed file system service to host computers via a network, comprising:
   network interface circuitry to be coupled to the network;
   one or more data storage devices to store file system data; and
   a storage processor coupled to the network interface circuitry and the data storage devices to perform file system operations of the distributed file system service using the data storage devices for underlying data storage, the file system operations including file read and file write operations,
   the storage processor including a multi-core processing unit and memory, the multi-core processing unit having a set of cores for respective independent instruction execution of instructions stored in the memory, the instructions including:
   (1) first instructions of a distributed file system application including respective sets of execution threads for the cores, each execution thread used to perform file system operations based on corresponding requests from the host computers,
   (2) second instructions of sets of network stream modules forming respective stream network stacks, sets of two or more of the stream network stacks being executed by respective cores, each stream network stack including a stream head to and from which the execution threads read and write stream data corresponding to the requests from and responses to the host computers via respective distinct host-specific connection-layer connections, and
   (3) third instructions of collector modules executed by the respective cores, a collector module of each core being operative on a per-request basis to (a) dynamically and preferentially assign execution threads of the core to the stream heads of the core to process first file system requests and responses in stream data of the respective stream network stacks, and (b) co-operate with collector modules of the other cores to dynamically and non-preferentially assign execution threads of the other cores to the stream heads of the core to process second file system requests and responses in stream data of the respective stream network stacks to promote efficient use of the cores in providing the distributed file system service.

2. A network attached storage system according to claim 1, wherein preferentially assigning execution threads of a core to respective stream heads of the core is performed when at least one of the execution threads of the core is idle, and wherein non-preferentially assigning execution threads of a core to respective stream heads of another core is performed when all execution threads of the core are busy and the other core has at least one execution thread that is idle.

3. A network attached storage system according to claim 1, wherein the collectors maintain respective queues of requests received from respective stream network stacks, entries of the queues identifying respective local stream heads which are to be read from to obtain corresponding file system service requests received by the respective stream network stacks, the entries of each queue having execution threads assigned thereto in sequential order.

4. A network attached storage system according to claim 3, wherein the collectors apply respective thresholds against the number of entries in the queues to determine when to direct a next request to another core rather than assigning a local execution thread to process the request.

5. A network attached storage system according to claim 1, wherein, for a request obtained from the stream head of a given core being processed by an execution thread of another core, the execution thread of the other core returns a corresponding response to the stream head of the given core, and the stream network stack of the given core returns the response to the host issuing the request.

6. A network attached storage system according to claim 1, wherein the stream network stacks of a core are operative to call a function of the collector of the core once well-formed file system requests are identified in received network traffic, and wherein the function of the collector responds by (1) adding an entry to a queue of requests, (2) selecting an execution thread for handling a queued request, and (3) activating the selected execution thread, and wherein an activated execution thread (4) obtains a next entry from the queue which identifies a corresponding stream head, (5) obtains a well-formed request by performing a read stream function on the identified stream head, (6) performs file system processing for the well-formed request, and (7) returns a corresponding response by performing a write stream function to the same stream head.

7. A network attached storage system according to claim 1, wherein the execution threads of the cores form respective pools of execution threads available for processing the requests, the execution threads transitioning from idle to in-use upon having stream heads assigned thereto for processing respective requests, the execution threads transition from in-use to idle upon completing the processing for respective requests including returning respective responses to the stream heads for delivery to respective host computers.

8. A method of operating a multi-core processor of a network attached storage system to process requests from host computers for services of a file system service, the method including, at each of a set of cores of the multi-core processor:

maintaining endpoints of respective connection-layer connections to the hosts to affine respective streams of network traffic with the core;
dynamically and preferentially assign execution threads of the core to process file system service requests of the streams affined with the core; and
co-operate with other cores of the set of cores to dynamically and non-preferentially (a) assign execution threads of the core to process file system service requests of the streams affined with the other cores, and (b) assign execution threads of the other cores to process file system service requests of the streams affined with the core.

9. A method according to claim 8, wherein preferentially assigning execution threads of a core to respective stream heads of the core is performed when at least one of the execution threads of the core is idle, and wherein non-preferentially assigning execution threads of a core to respective stream heads of another core is performed when all execution threads of the core are busy and the other core has at least one execution thread that is idle.

10. A method according to claim 8, wherein the collectors maintain respective queues of requests received from respective stream network stacks, entries of the queues identifying respective local stream heads which are to be read from to obtain corresponding file system service requests received by the respective stream network stacks, the entries of each queue having execution threads assigned thereto in sequential order.

11. A method according to claim 10, wherein the collectors apply respective thresholds against the number of entries in the queues to determine when to direct a next request to another core rather than assigning a local execution thread to process the request.

12. A method according to claim 8, wherein, for a request obtained from the stream head of a given core being processed by an execution thread of another core, the execution thread of the other core returns a corresponding response to the stream head of the given core, and the stream network stack of the given core returns the response to the host issuing the request.

13. A method according to claim 8, wherein the stream network stacks of a core call a function of the collector of the core once well-formed file system requests are identified in received network traffic, and wherein the function of the collector responds by (1) adding an entry to a queue of requests, (2) selecting an execution thread for handling a queued request, and (3) activating the selected execution thread, and wherein an activated execution thread (4) obtains a next entry from the queue which identifies a corresponding stream head, (5) obtains a well-formed request by performing a read stream function on the identified stream head, (6) performs file system processing for the well-formed request, and (7) returns a corresponding response by performing a write stream function to the same stream head.

14. A method according to claim 8, wherein the execution threads of the cores form respective pools of execution threads available for processing the requests, the execution threads transitioning from idle to in-use upon having stream heads assigned thereto for processing respective requests, the execution threads transition from in-use to idle upon completing the processing for respective requests including returning respective responses to the stream heads for delivery to respective host computers.

* * * * *